(12) United States Patent
Clark

(10) Patent No.: US 11,656,145 B2
(45) Date of Patent: May 23, 2023

(54) CONSUMABLE GAS LEAK DETECTION

(71) Applicant: Alarm.com Incorporated, Tysons, VA (US)

(72) Inventor: Colby Kevin Clark, Provo, UT (US)

(73) Assignee: Alarm.com Incorporated, Tysons, VA (US)

(*) Notice: Subject to any disclaimer, the term of this patent is extended or adjusted under 35 U.S.C. 154(b) by 0 days.

(21) Appl. No.: 17/507,925

(22) Filed: Oct. 22, 2021

(65) Prior Publication Data

US 2022/0128428 A1 Apr. 28, 2022

Related U.S. Application Data

(60) Provisional application No. 63/105,676, filed on Oct. 26, 2020.

(51) Int. Cl.
| | |
|---|---|
| *G01M 3/26* | (2006.01) |
| *G01D 4/02* | (2006.01) |
| *G05D 7/06* | (2006.01) |
| *G06V 20/52* | (2022.01) |

(Continued)

(52) U.S. Cl.
CPC ............... *G01M 3/26* (2013.01); *G01D 4/02* (2013.01); *G05D 7/0635* (2013.01); *G06V 20/52* (2022.01); *G01D 4/004* (2013.01); *G01D 2204/22* (2021.05); *G01D 2204/26* (2021.05); *G01M 3/243* (2013.01); *G06V 2201/02* (2022.01)

(58) Field of Classification Search
CPC ........ G01M 3/26; G01M 3/243; G06V 20/52; G06V 2201/02; G01D 4/02; G01D 4/004; G01D 2204/22; G01D 2204/26; G05D 7/0635

USPC ................................................... 137/2, 487.5
See application file for complete search history.

(56) References Cited

U.S. PATENT DOCUMENTS 5,126,934 A * 6/1992 MacFadyen .............. F17D 1/04
700/282
7,210,495 B1 * 5/2007 Olson ....................... F17D 5/06
137/561 A (Continued)

OTHER PUBLICATIONS

PCT International Search Report and Written Opinion in International Appln. No. PCT/US2021/056170, dated Jan. 28, 2022, 12 pages.

*Primary Examiner* — Minh Q Le
(74) *Attorney, Agent, or Firm* — Fish & Richardson P.C.

(57) ABSTRACT

Methods, systems, and apparatus for monitoring consumable gas usage are disclosed. A method includes obtaining, from one or more sensors installed at a property, sensor data that indicates one or more attributes of the property; based on the sensor data, determining an expected amount of gas consumption at the property; obtaining, from a gas meter installed at the property, gas meter data that indicates a gas consumption at the property; determining, based on the gas meter data and the expected amount of gas consumption, that the gas consumption at the property meets criteria for abnormal gas consumption; and based on determining that the gas consumption at the property meets criteria for abnormal gas consumption, performing one or more monitoring system actions. Determining an expected amount of gas consumption at the property comprises determining an operating status of each of a plurality of gas consuming appliances at the property.

20 Claims, 4 Drawing Sheets

(51) Int. Cl.
*G01M 3/24* (2006.01)
*G01D 4/00* (2006.01)

(56) References Cited

U.S. PATENT DOCUMENTS

| | | | | |
|---|---|---|---|---|
| 8,386,084 | B2* | 2/2013 | Koba | F23K 5/005 |
| | | | | 700/282 |
| 11,466,869 | B1* | 10/2022 | Clark | F24D 17/0078 |
| 2010/0188261 | A1* | 7/2010 | Fujii | G01F 1/66 |
| | | | | 431/13 |
| 2012/0326884 | A1 | 12/2012 | Cornwall | |
| 2013/0176143 | A1* | 7/2013 | Ivanier | G01D 4/004 |
| | | | | 340/870.03 |
| 2014/0230925 | A1* | 8/2014 | Halimi | G05D 7/0635 |
| | | | | 137/487.5 |
| 2016/0077531 | A1* | 3/2016 | Kucera | G05D 7/0647 |
| | | | | 137/485 |
| 2017/0230907 | A1* | 8/2017 | Rose | H04B 1/40 |
| 2018/0034657 | A1 | 2/2018 | Brown et al. | |
| 2018/0060977 | A1* | 3/2018 | McShane | G01D 4/02 |
| 2020/0132565 | A1 | 4/2020 | Kent et al. | |
| 2020/0370990 | A1* | 11/2020 | Chang | G05D 7/0635 |
| 2021/0011500 | A1* | 1/2021 | Halimi | F16K 37/005 |
| 2021/0054997 | A1* | 2/2021 | Sakata | G01F 1/00 |
| 2021/0164858 | A1* | 6/2021 | Armentrout | G01M 15/04 |

* cited by examiner

CONSUMABLE GAS LEAK DETECTION

CROSS-REFERENCE TO RELATED APPLICATIONS

This application claims the benefit of the U.S. Provisional Patent Application No. 63/105,676 filed Oct. 26, 2020, which is incorporated herein by reference in its entirety.

TECHNICAL FIELD

This disclosure relates generally to gas monitoring technology.

BACKGROUND

Gas usage monitoring is a process that includes monitoring gas usage. Typically, gas usage is monitored using gas consuming devices in residential and commercial properties to ensure gas flowing into these properties meets user-desired specifications.

One or more gas consuming appliances installed at a property may routinely consume gas. Typically, gas consumed by the one or more gas consuming appliances installed at the property is routed to the property via a network of one or more interconnected pipes. A particular pipe of the network of pipes can connect to the property at a metered connection point where gas enters the property for routing to the one or more gas consuming appliances. This metered connection point provides a location where all gas consumed by one or more gas consuming appliances installed at the property can be measured. A gas consuming appliance may include a clothes dryer, a range, a furnace, a water heater, a fireplace system, or the like.

SUMMARY

Techniques are described for consumable gas usage monitoring and gas leak detection. Gas leak detection can be used to detect leaks in residential and commercial systems using a gas meter.

Many commercial and residential properties include gas consuming appliances. For example, furnaces, water heaters, clothes dryers, and ranges (including ovens and stovetops) may consume natural gas while in operation. Small leaks may be present in systems that use or consume natural gas. Additionally, gas consuming appliances may become inefficient over time, causing the appliances to underperform for the amount of fuel consumed.

The gas meter unit can measure the flow of gas through the gas supply line. Information regarding the flow of gas can be relayed to the monitoring server via wired and/or wireless technologies. This information can be used to detect small leaks in the gas distribution system. The information can also be used to monitor the usage of appliances connected to the gas distribution system in order to provide insights into how much gas is being used by the appliances.

In some implementations, the gas meter unit can include, or can communicate with, a shut-off valve. In the event of a gas line rupture, leak, or an emergency at the property, the gas meter unit or the monitoring server can remotely operate the valve to shut. In this way, gas supply to the property can be automatically isolated in response to events detected by the gas meter unit.

In some implementations, multiple gas meter units can be installed in a gas distribution system of a property. For example, a gas meter unit can be placed on a branch of the gas distribution system that connects to an individual appliance or to a group of appliances. In this way, appliance-specific gas consumption measurements can be obtained. The appliance-specific gas consumption measurements can be used to pin-point a location of a gas leak, to monitor when the appliance is turned on and off, to evaluate gas usage efficiency of the appliance, etc.

A monitoring system can use gas meter data, as well as sensor data collected at the property, to identify abnormal gas usage, and to determine likely causes of abnormal gas usage. For example, the monitoring system can compare the amount of gas flow to an arming state of the property, to a status of a heating, ventilation, and air conditioning (HVAC) system, and/or to a status of a water heater to determine whether the amount of gas flow is normal or abnormal. If the monitoring system determines that the amount of gas flow is abnormal, the monitoring system can send an alert, e.g., to the system's owner or to emergency services. In some cases, based on detecting abnormal gas usage, the monitoring system can automatically shut off the supply of gas to the property.

Gas consumption monitoring and leak detection can be used to improve gas efficiency of a property. For example, based on gas meter data, the monitoring system can provide recommendations to property owners to inspect, repair, replace, or service underperforming gas consuming appliances. The monitoring system can also notify a property owner when and where gas leaks occur, so that the leaks can be repaired. The described techniques can be used to extend the life of gas consuming appliances, to reduce gas costs, and to detect and isolate gas leaks when they occur.

In general, one innovative aspect of the subject matter described in this specification can be embodied in methods including actions of obtaining, from one or more sensors installed at a property, sensor data that indicates one or more attributes of the property; based on the sensor data, determining an expected amount of gas consumption at the property; obtaining, from a gas meter installed at the property, gas meter data that indicates gas consumption at the property; determining, based on the gas meter data and the expected amount of gas consumption, that the gas consumption at the property meets criteria for abnormal gas consumption; and based on determining that the gas consumption at the property meets criteria for abnormal gas consumption, performing one or more monitoring system actions.

The foregoing and other embodiments can each optionally include one or more of the following features, alone or in combination. In some implementations, determining an expected amount of gas consumption at the property includes: determining an operating status of each of a plurality of gas consuming appliances at the property; and based on the operating status of each of the plurality of gas consuming appliances, estimating a gas consumption of each of the plurality of gas consuming appliances. The expected amount of gas consumption at the property includes a sum of the estimated gas consumption of each of the plurality of gas consuming appliances.

In some implementations, the operating status of each of the plurality of gas consuming appliances includes an on or off status of each of the plurality of gas consuming appliances.

In some implementations, the operating status of each of the plurality of gas consuming appliances includes a power level setting of each of the plurality of gas consuming appliances.

In some implementations, determining the operating status of each of the plurality of gas consuming appliances at the property includes: storing data identifying one or more of the plurality of gas consuming appliances at the property that are not capable of operation without human interaction; determining, based on the sensor data, that the property is unoccupied; and based on the data identifying the one or more gas consuming appliances at the property that are not capable of operation without human interaction, and based on determining that the property is unoccupied, determining that the identified one or more gas consuming appliances at the property is not in operation.

In some implementations, determining, based on the sensor data, that the property is unoccupied includes determining, based on at least one of motion sensor data, camera image data, or microphone data, that the property is unoccupied.

In some implementations, determining the operating status of each of the plurality of gas consuming appliances at the property includes: storing data indicating one or more gas consuming appliances at the property that is not capable of operation without human interaction; storing data identifying an area of the property in which each of the plurality of gas consuming appliances is located; determining, based on the sensor data, that one or more areas of the property are unoccupied; and based on determining that the one or more areas of the property are unoccupied, determining that the identified one or more gas consuming appliances in the one or more unoccupied areas of the property are not in operation.

In some implementations, the actions include determining the expected amount of gas consumption based on historical gas consumption at the property.

In some implementations, the one or monitoring system actions includes operating a shut-off valve to stop a flow of gas through a pipe supplying gas to the property.

In some implementations, the sensor data indicates an operating status of one or more gas consuming appliances at the property.

In some implementations, the property includes a plurality of gas consuming appliances, the gas meter data indicates an amount of gas consumption by a subset of the plurality of gas consuming appliances at the property, and performing the one or more monitoring system actions includes operating one or more shut-off valves to stop a flow of gas through a pipe supplying gas to the subset of the plurality of gas consuming appliances.

In some implementations, the sensor data includes a temperature at the property, and determining the expected amount of gas consumption at the property includes: determining a thermostat setting at the property; based on the temperature at the property and the thermostat setting, determining an operating status of an HVAC system at the property; and determining the expected amount of gas consumption at the property based at least in part on the operating status of the HVAC system.

In some implementations, determining that the gas consumption at the property meets criteria for abnormal gas consumption includes determining that the gas consumption at the property exceeds the expected amount of gas consumption by at least a specified threshold amount.

In some implementations, determining that the gas consumption at the property meets criteria for abnormal gas consumption includes determining that the gas consumption at the property is within a range of gas consumption that corresponds to a likely gas leak.

In some implementations, determining that the gas consumption at the property meets criteria for abnormal gas consumption includes determining that a rate of change of gas consumption exceeds a specified threshold rate of change of gas consumption.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description, the drawings, and the claims.

BRIEF DESCRIPTION OF THE DRAWINGS

Like reference numbers and designations in the various drawings indicate like elements.

DETAILED DESCRIPTION

Figure 1A:
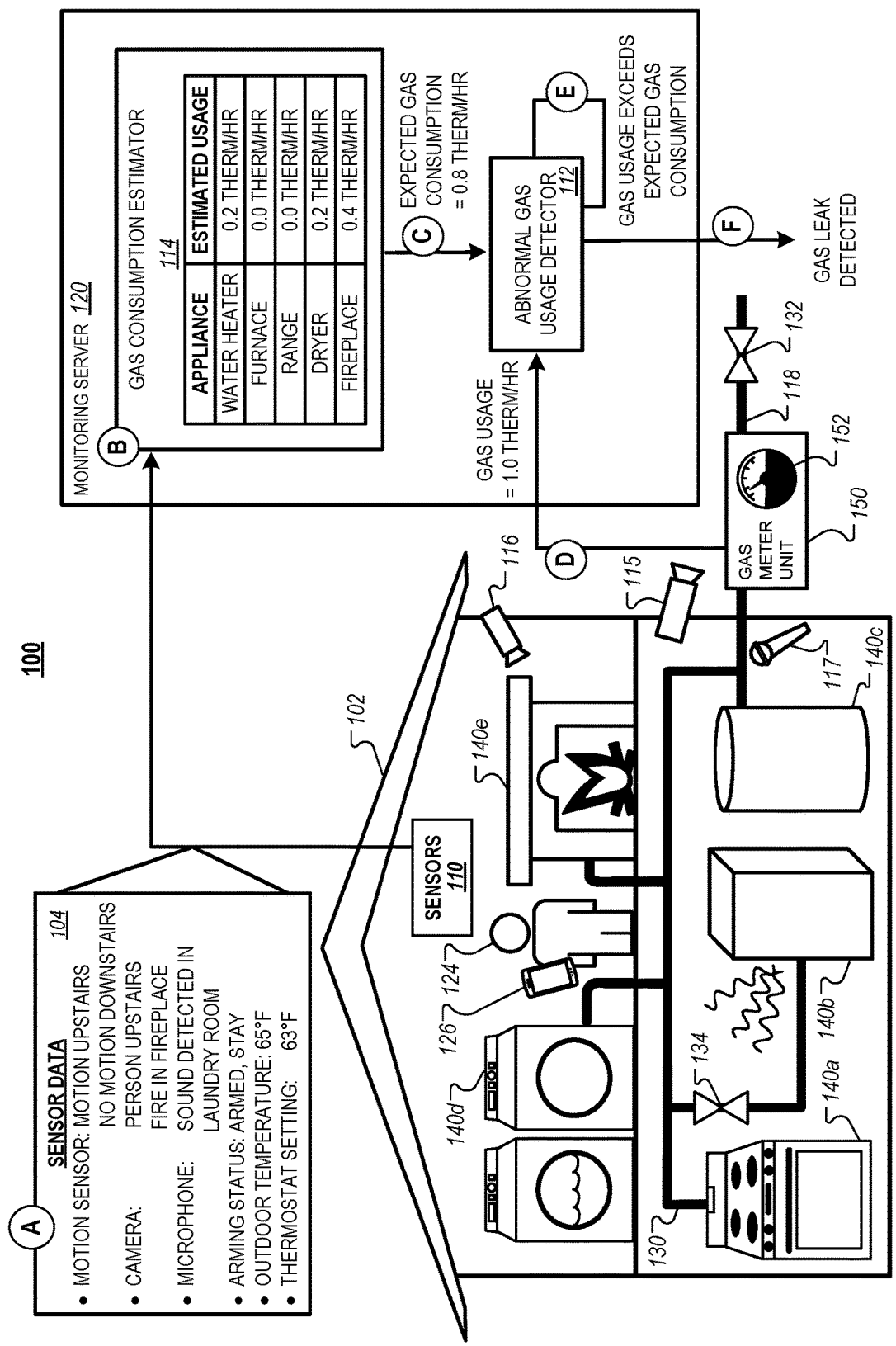
FIGS. 1A and 1B are diagrams illustrating examples of a consumable gas leak detection system.

FIG. 1A is a diagram illustrating an example of a consumable gas leak detection system 100. The system 100 includes a property 102 with a system of pipes 130 for supplying gas to appliances 140a, 140b, 140c, 140d, 140e ("140a-e"), where the appliances 140a-e can be in different locations of the property 102.

A gas meter can be used to measure gas consumption of the property 102, gas consumption of individual appliances 140a-e at a property, or both. Gas meter measurements can also be used to determine if a gas leak may exist at the property. For example, if no appliances at the property are using gas and the gas meter shows that gas is being consumed, it can be inferred that there is a leak in the gas distribution system.

In the example of FIG. 1A, the gas consuming appliances 140a-e are appliances that consume natural gas. However, the techniques described in this specification can also be applied to other types of gas consumption. For example, the techniques can be used to monitor usage and to detect leaks from systems that use fuel oil, kerosene, propane gas, etc.

In more detail, the gas distribution system of the property 102 includes a system of pipes 130 for supplying gas from a gas supply pipe 118 to various locations throughout the property 102. For example, the gas supply pipe 118 may connect to a municipal gas supply, a well, or another gas source. A gas meter unit 150 installed on the gas supply pipe 118 measures the flow rate of gas through the gas supply pipe 118.

The gas meter unit 150 can be a computing system that includes a gas meter 152. The gas meter 152 can be any kind of gas flow meter. For example, the gas meter 152 can be a bellows meter, a rotary meter, a turbine meter, an orifice meter, an ultrasonic flow meter, etc. The gas meter 152 can measure the flow of gas through a pipe, e.g., the gas supply pipe 118.

The gas meter unit 150, can be connected to a gas supply line where gas enters the property 102. In some examples, the gas meter unit 150 may be a separate device from the gas utility meter. The gas meter unit 150 can include a communication module that enables the gas meter unit 150 to communicate with one or more computing systems of a property monitoring system. For example, the gas meter unit 150 may be able to communicate with a remote monitoring server 120, with one or more sensors 110 at the property 102, and with the appliances 140a-e.

Though the system 100 includes only one gas meter unit 150, other number of gas meter units may be possible. For example, a property may have multiple gas meter units installed at the property. The multiple gas meter units may be installed on branches of the gas piping system. For example, a gas meter unit 150 may be installed on a branch, or leaf, of the piping, that connects the gas piping system to a furnace 140b.

The flow rate of gas through the gas supply pipe 118 is indicative of gas consumption at the property 102. The gas meter unit 150 can measure gas flow through the pipe in units of, e.g., therms per hour (therm/hr), cubic feet per minute (cfm), cubic meters per day (cmd), or British thermal units per hour (Btu/hr). In the examples described in this specification, gas consumption will be described in units of therm/hr.

Connected to the piping system 130 are the appliances 140a-e. The appliances 140a-e are fixtures and/or devices at the property 102 that consume gas. The appliances 140a-e can be, for example, water heaters, clothes dryers, ranges, fireplaces or any other fixture in the property 102 from which gas is consumed. The appliances 140a-e can be located in different areas of the property 102. For example, the property 102 includes an appliance 140a that is a range located in a lower level kitchen, and an appliance 140c that is a water heater and an appliance 140b that is a furnace both located in a lower level utility room. The property 102 also includes a dryer 140d and a gas fireplace 140e, both located on an upper level.

In system 100, the gas meter unit 150 communicates with the monitoring server 120. The gas meter unit 150 can send gas usage data to the monitoring server 120. In some examples, the gas meter unit 150 can send gas usage data to the monitoring server 120 in real-time. For example, the gas meter unit 150 can transmit, to the monitoring server 120, the amount of gas that is flowing to the property 102 at any given time. In some examples, the gas meter unit 150 can send gas usage data to the monitoring server 120 periodically or occasionally. For example, the gas meter unit 150 may send the gas usage data to the monitoring server 120 at designated intervals, e.g., once per ten minutes, once per half hour, or once per hour.

In some cases, the gas usage data can include a snapshot of gas usage, e.g., the flow rate of gas flowing to the property 102 at a particular moment. In some cases, the gas usage data can include an average flow rate of gas flowing to the property 102 over a time period.

The monitoring server 120 can determine gas usage patterns based on the gas usage data from the gas meter unit 150. For example, a range at the property 102 may run most evenings at approximately the same time as one of the residents of the property 102 prepares dinner. Thus, the monitoring server 120 can determine that the gas usage of the property 102 is higher in the evening time than during other times of day.

The monitoring server 120 can also generate gas usage criteria based on gas usage data from the gas meter unit 150. The gas usage criteria can be, for example, an expected gas consumption that indicates a likely leak at the property 102. In some examples, the gas usage criteria can be a range of gas usage amounts. If the current gas usage falls within the range, the monitoring server 120 can determine that a leak likely exists. In some examples, the gas usage criteria can be based on a rate of change of gas usage, a difference in gas usage between historical gas usage and current gas usage, or other criteria.

If the gas usage of the property 102 meets criteria for a gas leak, the monitoring server 120 can determine that there is likely a gas leak at the property 102. Determining that the gas usage of the property 102 meets criteria for a gas leak can include, for example, determining that the gas usage of the property 102 exceeds the expected gas consumption, falls within the gas usage range, or exceeds a threshold rate of change of gas usage.

The system 100 includes one or more sensors 110 located throughout the property 102 that collect sensor data 104 related to the property 102. For example, the sensors 110 can include motion detectors that detect movement at a location of the property 102, microphones that detect audio at the property 102, geofencing sensors that identify electronic devices that are at or near the property 102, and cameras that record data related to activity or conditions on the property 102. The sensors 110 can also include occupancy sensors, a clock, an arming status of a security system, door or window lock sensors, smoke detectors, air quality sensors, or other sensors that provide information related to a state or condition of the property 102.

In some cases, the sensors 110 may communicate with a control unit, which can be, for example, a computer system located at the property 102. The control unit can be configured to exchange data with the sensors 110 and to perform various actions and operations for controlling the functionality of the monitoring system components located at the property 102.

The sensors 110 may communicate with a monitoring server 120. For example, a motion detector may send data indicating that movement has been detected. A camera may send still or video images of a portion of the property 102. A microphone 117 may send audio data recorded in a region of the property 102. The monitoring server 120 can be one or more computer or server systems that process, analyze, and/or store data related to the property 102 received from the sensors 110. In some implementations, the monitoring server 120 is remote from the property 102 and the sensors 110 and monitoring server 120 communicate via a long-range data link. The long-range data link can include any combination of wired and wireless data networks. For example, the sensors 110 can exchange information with the monitoring server 120 through a wide-area-network (WAN), a cellular telephony network, a wireless data network, a cable connection, a digital subscriber line (DSL), a satellite connection, or other electronic means for data transmission. The sensors 110 and the monitoring server 120 may exchange information using any one or more of various communication synchronous or asynchronous protocols, including the 802.11 family of protocols, GSM, 2G, 3G, 5G, LTE, CDMA-based data exchange or other techniques.

The monitoring server 120 may receive the generated sensor data 104 and provide the generate sensor data 104 to a gas consumption estimator 114. The gas consumption estimator 114 may include one or more software modules, one or more hardware modules, or a combination of both. In other implementations, the monitoring server 120 may receive the generated sensor data 104 and provide data describing gas meter data at the property 102 to the gas consumption estimator 114 that is based on the received sensor data 104. In yet other implementations, the monitoring server 120 may receive data describing estimated gas consumption at the property 102 that is based on the generated sensor data 104, and might not receive the sensor data 104 itself.

An example of consumable gas leak detection by the consumable gas leak detection system is illustrated in stages (A) through (F). In the example illustrated in FIG. 1A, a single resident 124 is at the property 102.

In stage (A), the sensors 110 send the sensor data 104 to the monitoring server 120. In some examples, the sensors 110 may send the sensor data 104 to a control unit, and the control unit may send the data to the monitoring server 120. The sensor data 104 can include, for example, motion sensor data, camera data, geofencing data, and microphone data. The sensor data 104 can also include an arming status of a property monitoring system, temperature data, a thermostat setting, and a time of day.

In some examples, the sensor data 104 can include occupancy data. The occupancy data can include the occupancy of the property, the occupancy of individual rooms of a property, or both. In some examples, a computing system may generate the occupancy data based on analyzing other sensor data 104 e.g., motion sensor data, camera data, audio data, geofencing data, door sensors etc. For example, an occupancy sensor, a control unit, or a monitoring server, e.g., the monitoring server 120, may receive the sensor data 104. Based on analyzing the sensor data 104, the occupancy sensor, control unit, or monitoring server may generate the occupancy data.

In the example of FIG. 1A the sensor data 104 includes motion sensor data, camera data, microphone data, an arming status, an outdoor temperature, and a thermostat setting. The sensor data 104 includes motion sensor data that indicates motion detected upstairs, and no motion detected downstairs at the property. The motion sensor data may also include historical motion sensor data. For example, the motion sensor data can include historical motion sensor data for the previous several hours or the previous day. For example, the motion sensor data may indicate that motion has been detected on the upper level of the property for the past hour, and that no motion has been detected on the lower level of the property for that past hour. The historical motions sensor data may indicate motion of one person throughout the property 102.

The camera data indicates a person upstairs at the property 102. Similar to the motion sensor data, the camera data may include historical camera data that indicates human activity throughout the property 102 of the resident 124. The camera data may include images of the resident 124 putting clothes in the clothes dryer 140d and turning on the gas fireplace 140e.

The microphone data indicates audio detected in the upstairs laundry room at the property 102. The microphone data may indicate the sounds of the clothes dryer 140d operating.

The arming status of the monitoring system of the property 102 is set to "armed, stay." The arming status "armed, stay" indicates that at least one resident is likely at the property 102, and that the security system is armed. In some cases, the arming status may be selected by a user, e.g., the resident 124. In some cases, the arming status may be pre-programmed, e.g., based on the time of day.

The sensor data 104 includes outdoor temperature data indicating that the outdoor temperature at the property is sixty-five degree Fahrenheit (F). The sensor data 104 also includes data indicating that the thermostat is set to sixty-three degrees F.

In stage (B), the monitoring server 120 receives the sensor data 104. The monitoring server 120 includes a gas consumption estimator 114 and an abnormal gas usage detector 112. The gas consumption estimator 114 and the abnormal gas usage detector 112 can each be provided as one or more computer executable software modules or hardware modules. That is, some or all of the functions of the gas consumption estimator 114 and the abnormal gas usage detector 112 can be provided as a block of computer code, which upon execution by a processor, causes the processor to perform functions described below. Some or all of the functions of the gas consumption estimator 114 and the abnormal gas usage detector 112 can be implemented in electronic circuitry, e.g., by individual computer systems (e.g., servers), processors, microcontrollers, a field programmable gate array (FPGA), or an application specific integrated circuit (ASIC).

In the example of FIG. 1A, in stage (B), the gas consumption estimator 114 estimates gas consumption of each gas consuming appliance at the property 102, and total estimated gas consumption at the property. The expected gas consumption for each appliance may be based on sensor data 104 received from the sensors 110, and based on data stored by the monitoring server 120.

The monitoring server 120 may determine the expected gas consumption based at least in part on information related to the gas piping systems 130 at the property 102. For example, the gas piping system information can include a number and type of gas consuming appliances at the property 102. The gas piping system information can also include a number and type of gas consuming appliances that may operate automatically, e.g., without human interaction. For example, water heater or furnace system may operate without human interaction. Additionally, appliances such as fireplaces and ranges may be capable of operation without human interaction. For example, a resident may program the range 140a to begin a cycle at a certain time when the resident may or not be home.

The expected gas consumption is a gas usage level based on operating conditions of the appliances 140a-e, as indicated by the sensor data 104. The expected gas consumption of each appliance can be based on a number of factors related to the particular appliance. For example, the size, model, and mode of operation of the appliance can affect the estimated gas consumption of the appliance. As an example, the range 140a may consume more gas when the stovetop is operation than when the oven is in operation. The monitoring server 120 may store data indicating the estimated gas consumption of the range when the stovetop is in use, when the oven is in use, and when both the stovetop and the oven are in use.

In the example of FIG. 1A, based on the outdoor temperature of sixty-five degrees F. and the thermostat setting of sixty-three degrees F., the gas consumption estimator 114 estimates that the furnace 140b is off, and that gas consumption by the furnace is zero therm/hr. Based on estimated hot water usage at the property 102, the gas consumption estimator 114 also estimates that the water heater 140c is consuming 0.2 therm/hr. Based on no motion or camera activity on the lower level of the property 102, the gas consumption estimator 114 estimates that the range 140a is off, and that a gas consumption of the range 140a is zero therm/hr. Based on motion sensor data, and camera data, and microphone data collected from the upstairs level, the gas consumption estimator 114 estimates that the fireplace 140e is operating and that gas consumption of the fireplace 140e is 0.4 therm/hr. Also based on motion sensor data, camera data, and microphone data, the gas consumption estimator 114 estimates that the dryer 140d is operating and that gas consumption of the dryer 140d is 0.2 therm/hr.

In stage (C), the gas consumption estimator 114 outputs an expected gas consumption based on the sensor data 104. The gas consumption estimator 114 outputs the expected gas consumption based on the combined estimated gas consumption of the appliances 140a-e at the property 102. For example, based on the estimated gas consumption of 0.2 therm/hr by the water heater, 0.2 therm/hr by the dryer, and 0.4 therm/hr by the fireplace, the gas consumption estimator 114 estimates a total estimated gas consumption of 0.8 therm/hr.

In stage (D), the gas meter unit 150 sends gas usage data to the monitoring server 120. In some cases, the gas usage data can include an average flow rate of gas flowing to the property 102 over a time period. For example, the gas usage data can include an average flow rate of gas flowing to the property 102 over a time period of a minute, ten minutes, thirty minutes, an hour, etc.

In some examples, the gas meter unit 150 may average the gas usage and may send the average gas usage data to the monitoring server 120. In some examples, the gas meter unit 150 may transmit gas usage data in real-time, and the monitoring server 120 may calculate the average gas usage. Averaging the gas usage can improve the detection of gas leaks while reducing the number of false alarms. Some gas consuming appliances may use a large amount of gas in a short amount of time, and may otherwise not use gas. The gas meter can average the gas usage in order to prevent short bursts of gas usage from triggering a false alarm for a gas leak.

In some implementations, other means for detecting gas consumption can be used, in addition to or instead of the gas meter unit 150. For example, in some implementations, a camera 115 may be installed and aimed at a gas utility meter, e.g., the gas meter 152. The camera 115 can use video analytics to analyze images of the gas meter 152 in order to read the gas meter 152. In this way, the camera 115 can determine gas flow rate through the supply pipe 118 to the property 102. In these examples, the camera 115 can send the gas usage data to the monitoring server 120 instead of, or in addition to, the gas meter unit 150 sending the gas usage data. In some implementations, the camera 115 can transmit images of the gas meter 152 to the monitoring server 120. The monitoring server 120 can then analyze the images of the gas meter 152 to determine the gas usage.

In some implementations, a microphone 117 may be installed on or near gas piping. The microphone 117 can be installed in addition to, or instead of, the gas meter unit 150 and the camera 115. The microphone 117 can detect and analyze the sound of the gas flowing through the pipe. The microphone 117 can be calibrated to determine, based on the sound of the gas flowing through the piping, the flow rate of gas through the pipe. Based on the acoustic signature of the gas flowing through the piping, the microphone 117 can determine the gas usage of the property. In these examples, the microphone 117 can send the gas usage data to the monitoring server 120. In some implementations, the microphone 117 can send recorded audio data to the monitoring server 120. The monitoring server 120 can then analyze the audio data to determine the gas usage.

In some implementations, the gas consumption monitoring system can include a combination of gas meter units, cameras, and microphones to determine gas usage. For example, the system can include a gas meter unit 150 installed on a supply line to the property, a gas meter and a camera installed on a branch of piping that connects to the clothes dryer 140d, and a microphone installed on a branch of piping that connects to the water heater 140c. The monitoring server 120 can receive data from the gas meter unit, the camera, and the microphone. Based on the received data, the monitoring server 120 can determine the gas consumption of the property, and the gas consumption of individual appliances, e.g., the clothes dryer 140d and the water heater 140c.

In some implementations, data from the camera 115 and/or the microphone 117 can be used to verify or confirm data from other sources. For example, the gas meter unit 150 may transmit data to the monitoring server 120 indicating gas flow rate through the pipe 118. The camera 115 and the microphone 117 may also transmit data to the monitoring server 120 indicating gas flow rate through the pipe 118. The monitoring server 120 can compare the gas flow rate data transmitted from the camera 115 and the microphone 117 to the gas flow rate data transmitted from the gas meter unit 150. If multiple sensors report an abnormal gas flow rate, the monitoring server 120 can increase a confidence level of the determination of the abnormal gas flow rate.

In some implementations, the monitoring server 120 may require two or more indications of a gas leak before performing a system action. For example, the monitoring server 120 may require an indication of abnormal gas consumption from the gas meter 152 and from the microphone 117 before performing a system action of shutting the shut-off valve 132 or of notifying emergency services. Requiring two or more indications of a gas leak can reduce the likelihood of false alarms.

The abnormal gas usage detector 112 evaluates the gas usage to determine if the gas usage meets criteria for a leak. The abnormal gas usage detector 112 can compare the gas usage to the expected gas consumption to determine if the gas usage exceeds the expected gas consumption.

In the example of FIG. 1A, the gas meter unit 150 transmits a gas usage of 1.0 therm/hr to the monitoring server 120. The gas usage of 1.0 therm/hr is due to operation of the dryer 140d, operation of the water heater 140c, operation of the fireplace 140e, and a gas leak from the furnace 140b. The gas usage of 1.0 therm/hr may be a real-time indication of gas usage or may be averaged over a time period, e.g., of several minutes.

In stage (E), the abnormal gas usage detector 112 compares the gas usage of 1.0 therm/hr to the expected gas consumption of 0.8 therm/hr. The abnormal gas usage detector 112 determines that the gas usage exceeds the expected gas consumption by 0.2 therm/hr. The monitoring server 120 therefore determines that a leak is detected at the property 102.

In some implementations, the monitoring server 120 may analyze the sensor data and the gas consumption to determine whether the excess gas usage is due to a leak or to a powered on appliance. For example, the monitoring server 120 may analyze the camera data e.g., from the camera 116, to determine if any of the gas consuming appliances 140a-e appear to be unexpectedly powered on. For example, the range 140a and the dryer 140d may illuminate lights on a control panel when powered on. In another example, the fireplace 140e may produce flames when powered. The monitoring server 120 can perform image analysis on the camera data, in order to identify gas consuming appliances 140a-e that are unexpectedly powered on. The monitoring server 120 can also analyze audio data from a microphone to determine if a gas consuming appliance is producing sounds that indicate the appliance is powered on. For example, the dryer 140d may produce sounds when in operation. Based on analyzing the sensor data, the monitoring server 120 may determine that no appliances that are unexpectedly powered on. Thus, the monitoring server 120 can determine that the excess gas consumption is due to a gas leak.

The abnormal gas usage detector 112 is configured to analyze the received gas meter data that is indicative of the gas consumption by the property 102 for the detection of a potential leak. In the example of a consistent, extremely slow low flow furnace leak 174 (e.g., 0.1 therm/hour, or even less) of FIG. 1, the abnormal gas usage detector 112 can evaluate the gas meter data received from the property 102 to determine whether the consumption (or flow) of gas has been detected at the property 102 for more than a predetermined amount of time. In response to determining that the consumption (or flow) of gas has been detected for more than a predetermined period of time (e.g., 1 hour, 2 hours, 5 hours, or the like), the abnormal gas usage detector 112 may determine that there is a potential extremely slow, low flow leak at the property 102.

In stage (F), the abnormal gas usage detector 112 outputs an indication that a gas leak is detected at the property 102. As a result of determining that the leak is detected, the monitoring server 120 may perform one or more actions. In some implementations, the monitoring server 120 can communicate with an authorized user device, e.g., the mobile device 126, and the monitoring server 120 can send a notification or alert to the mobile device 126. The user device can be, for example, a mobile phone, a smart phone, a tablet computer, a smart watch, or another mobile computing device. The user device can also be a personal computer, a laptop computer, a smart speaker, an electronic home assistant, or another computing device. In some examples, the user device can be a robotic device.

In such instances, the abnormal gas usage detector 112 may perform one or more operations to mitigate damage that can occur as a result of the gas leak. For example, the abnormal gas usage detector 112 (or other software unit of monitoring server 120) can transmit a notification to a resident of the property 102 to notify the resident of the property 102 of the small leak. Such a notification may be transmitted by the monitoring server 120 to the mobile device 126 of the resident 124 of the property. The notification may indicate that a leak is suspected at the property. The notification can also include a time of detection of the leak and the flow rate of the suspected leak. In some examples, the monitoring server 120 may place a telephone call to the mobile device 126 or to a telephone at the property 102 to notify the resident 124 of the suspected leak. The notification may trigger the display of a graphical user interface. The graphical user interface may display visual representations of the gas meter data for the property 102.

The mobile device 126 can execute one or more software applications that enable it to communicate with the monitoring server 120 and/or a control unit at the property 102. Through the software application, the mobile device 126 can receive notifications or alerts from the monitoring system and/or send commands to the monitoring system to control various system actions or operations.

In some examples, the monitoring server 120 may send instructions directing one or more automatic devices at the property to operate. For example, the gas piping system 130 at the property 102 may have a shut-off valve 132 that is capable of remote operation. The shut-off valve 132 is configured to receive messages across a network from one or more components of the system 100 such a monitoring system control unit, the monitoring server 120, the mobile device 126, or a combination thereof. For example, the monitoring server 120, the monitoring server 120, the mobile device 126, or a combination thereof, may transmit a message to the shut-off valve 132 that instructs the shut-off valve 150c to close the shut-off valve and cut-off the gas supply to gas consuming appliances 140a-e installed at the property 102. Alternatively, the monitoring system control unit, the monitoring server 120, the mobile device 126, or a combination thereof may transmit a message to the shut-off valve 132 that instructs the shut-off valve 132 to open the shut-off valve and allow gas consuming appliances 140a-e installed at the property 102 to access the gas supply.

In response to detecting the suspected leak at the property 102, the monitoring server 120 may send an instruction to shut the shut-off valve 132 in order to stop gas flow to the property 102. Shutting the shut-off valve 132 causes the furnace 140b to stop leaking gas.

In some examples, a remotely operated shut-off valve 134 may be located on a leaf or branch of the piping system 130. For example, the shut-off valve 134 is located on a leaf of the piping system 130 that connects to the furnace 140b. In response to detecting the suspected leak at the property 102, the monitoring server 120 may send an instruction to shut the shut-off valve 134 in order to stop gas flow to the furnace 140b. Shutting the shut-off valve 134 causes the furnace 140b to stop leaking gas without affecting other gas consuming appliances 140a, 140c, 140d, 140e at the property 102.

In some implementations, the monitoring server 120 can apply one or more rules to determine actions to perform. For example, the monitoring system can apply a rule that a discrepancy of greater than 0.1 therm/hr between the expected gas consumption and the gas usage is classified as a gas leak. In another example, the monitoring server 120 can apply a rule indicating that whenever a leak is detected, the monitoring server 120 sends a notification to the mobile device 126. In another example, the monitoring server 120 can apply a rule indicating that when the arming status is "armed, away" and a leak is detected, the monitoring server 120 sends a command to the shut-off valve 132 to stop gas flow to the property 102. The rules can be predetermined (e.g., default rules) and stored in a memory system accessible by the monitoring server 120. In some implementations, a user, e.g., the resident 124, can adjust, remove, or add rules to customize the monitoring server 120 response for their particular property 102 and preferences.

Though described above as being performed by the monitoring server 120, stages (A) through (F) can be performed by a control unit, by the gas meter unit 150, by a combination of a control unit, the monitoring server 120, and the gas meter unit 150, or by another computer system.

Figure 1B:
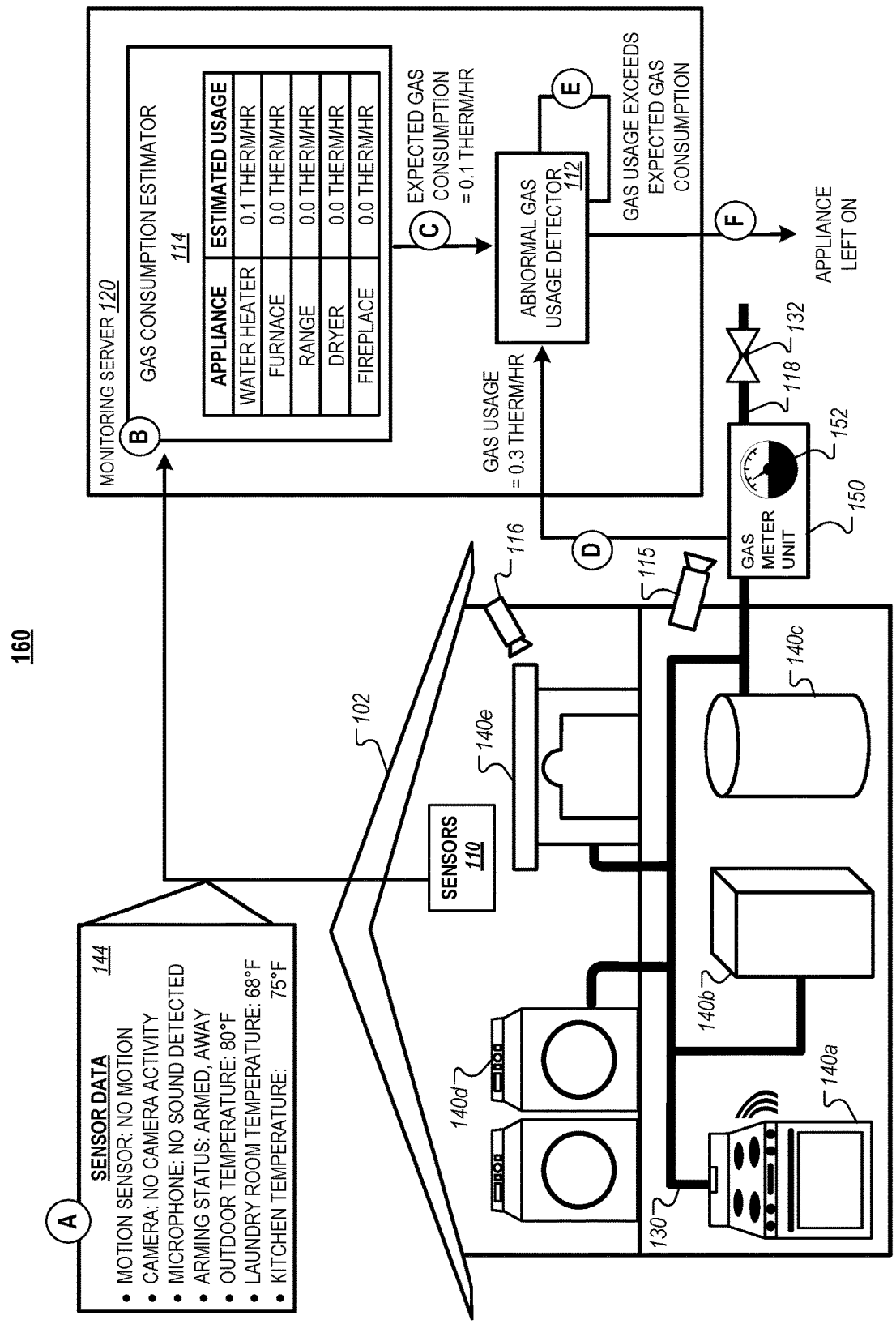

FIG. 1B is another diagram illustrating an example of a consumable gas leak detection system 160. The system 160 may operate similarly to the system 100 described in FIG. 1A. An example of consumable gas leak detection by the system 160 is illustrated in stages (A) through (F). In the example illustrated in FIG. 1B, no residents are at the property 102.

In stage (A) of FIG. 1B, the sensors 110 send sensor data 144 to the monitoring server 120. The sensor data 144 includes motion sensor data that indicates no motion detected on the upper level at the property 102 or on the lower level of the property 102. The camera data also indicates no camera activity at the property 102. The microphone data indicates no audio detected at the property 102.

The arming status of the monitoring system of the property 102 is set to "armed, away." The arming status "armed, away" indicates that the property 102 is likely unoccupied, and that the security system is armed.

The sensor data 144 includes temperature data indicating that the outdoor temperature at the property is eighty degrees F. The sensor data 144 also indicates that the temperature of the laundry room is sixty-eight degrees F., and that the temperature of the kitchen is seventy-five degrees F.

In stage (B), the monitoring server 120 receives the sensor data 144. The gas consumption estimator 114 estimates gas consumption of each gas consuming appliance at the property 102, and total estimated gas consumption at the property, based on the sensor data 144.

Based on the motion sensor data, the camera data, the microphone data, and the arming state of "armed, away," the gas consumption estimator 114 determines that the property 102 is likely unoccupied. Based on determining that the property 102 is likely unoccupied, the gas consumption estimator 114 determines that appliances that require human interaction are likely not operating. Thus, the gas consumption estimator 114 determines that the dryer 140d, the range 140a, and the fireplace 140e are not operating. The gas consumption estimator also determines that water fixtures are likely not in use at the property 102, and that the water heater 140c is likely consuming a baseline amount of gas, e.g., 0.1 therm/hr.

Based on the outdoor temperature of eighty degrees F., the laundry room temperature of sixty-eight degrees F., and the kitchen temperature of seventy-five degrees F., the gas consumption estimator 114 determines that the furnace is not operating. The gas consumption estimator 114 also determines that the kitchen is seven degrees hotter than the laundry room.

In stage (C), the gas consumption estimator 114 outputs an expected gas consumption based on the sensor data 144. The gas consumption estimator 114 outputs the expected gas consumption based on the combined estimated gas consumption of the appliances 140a-e at the property 102. For example, based on the estimated gas consumption of 0.1 therm/hr by the water heater only the gas consumption estimator 114 estimates a total estimated gas consumption of 0.1 therm/hr.

In stage (D), the gas meter unit 150 sends gas usage data to the monitoring server 120. The gas meter unit 150 transmits a gas usage of 0.3 therm/hr to the monitoring server 120. The gas usage of 0.3 therm/hr is due to the gas flowing to the water heater 140c and is due to gas flowing to the range 140a, which has been left on.

In stage (E), the abnormal gas usage detector 112 compares the gas usage of 0.3 therm/hr to the expected gas consumption of 0.1 therm/hr. The abnormal gas usage detector 112 determines that the gas usage exceeds the expected gas consumption by 0.2 therm/hr.

The monitoring server 120 can analyze the sensor data 144 and the gas meter data to determine whether the excess gas usage is due to a leak or to a powered on appliance. For example, the monitoring server 120 may analyze the sensor data 144 indicating that the temperature in the kitchen is seven degrees warmer than the temperature in the laundry room. Based on the difference in temperatures, the monitoring server 120 may determine that the range 140a is likely powered on. The monitoring server 120 may confirm that the range 140a is powered on, e.g., by analyzing camera data. The camera data may indicate lights illuminated on a panel of the range 140a when the range 140a is powered on.

In some examples, the monitoring server 120 may be able to determine, based on the amount of gas that is leaking, a particular appliance or multiple appliances that are powered on. For example, the monitoring server 120 may store data indicating typical gas consumption of appliances. The monitoring server 120 may be able to disaggregate the total amount of gas consumption to determine which appliances are powered on. As an example, the monitoring server 120 may store data indicating that the range 140a typically uses 0.2 therm/hr when powered on, that the furnace 140b typically uses 0.6 therm/hr when powered on, and that the fireplace 140e typically uses 0.5 therm/hr when powered on. Thus, based on the gas usage exceeding the expected usage by 0.2 therm/hr, the monitoring server 120 can determine that the range 140a is more likely to be powered on than the furnace 140b or the fireplace 140e.

The techniques described with respect to FIGS. 1A and 1B can be applied in various implementations. In some implementations, a monitoring system for home or business that produces its own energy via a generator could determine an amount of fuel the generator is consuming and the amount of electrical power being consumed by electrical appliances at the property. The monitoring system can provide the owner information related to a length of time that the fuel supply is expected to last.

In some implementations, a monitoring system for a commercial kitchen could measure gas consumption during different shifts. The monitoring system could provide an owner with information indicating the amount of gas consumption used by each shift crew. The owner could use the information to determine which shift crews are efficient and inefficient with gas usage. The information can assist the owner to improve efficiency, e.g., by providing recommendations to power off gas appliances when not in use.

In some implementations, a property monitoring system can determine that a gas leak exists based on data from a gas meter and from an explosive gas detector. For example, some properties may have an explosive gas detector installed. The explosive gas detector may be combined with a carbon monoxide detector, a smoke detector, or both. The monitoring system may receive data indicating that the explosive gas detector is activated at a property. The monitoring system may analyze gas usage data and determine that gas usage is higher than expected. Based on the gas usage data, the monitoring system can confirm that a gas leak likely exists at the property. In another example, in response to receiving the data indicating that the explosive gas detector is activated, the monitoring system may analyze the gas usage data and determine that the gas usage is as expected, or is zero. Thus, the monitoring system can determine that no gas leak exists from gas appliances at the property. The monitoring system can rule out a false positive explosive gas detector activation based on determining that no gas leak exists at the property, In some implementations, a property monitoring system can determine that a gas consuming appliance is not operating properly or is not properly vented based on data from a carbon monoxide detector. For example, the monitoring system may receive data indicating that the carbon monoxide detector is activated at the property. The monitoring system may analyze gas usage data and determine which gas consuming appliances are in operation or were recently in operation. Based on determining which gas consuming appliances are in operation, the monitoring system can determine which gas consuming appliances are likely causing the carbon monoxide detector to activate. In another example, the monitoring system may determine that no gas consuming appliances are operating or have recently operated. In this example, the monitoring system can determine that the carbon monoxide detector activation is a false alarm, or can determine that the source of the carbon monoxide is another source, e.g., a vehicle at the property.

In some implementations, a property monitoring system can include multiple gas meter units. The monitoring server 120 can analyze data from the multiple gas meter units in order to determine gas consumption of individual appliances. For example, a gas meter unit may be installed on a branch of piping that connects to the fireplace 140e. The gas meter unit can measure gas consumed by the fireplace 140e. The monitoring server 120 can also use data from gas meter units installed on branches of piping to identify particular appliances that are leaking or that are powered on.

For example, camera data from the camera 116 may indicate that the fireplace 140e is off, e.g. no flames are visible in the fireplace 140e. Gas usage data from a gas meter unit on the fireplace branch may indicate that the fireplace 140e is consuming 0.3 therm/hr. The monitoring server 120 may store data indicating that, when in operation, the fireplace 140e typically consumes 0.5 therm/hr. Based on the gas usage data, the monitoring server 120 can determine that the fireplace 140e is consuming gas. Based on the camera data, the monitoring server 120 can determine that the fireplace 140e is likely powered off. Based on the gas usage of 0.3 therm/hr being less than the typical usage of 0.5 therm/hr, the monitoring server 120 can confirm that the fireplace 140e is likely powered off. Thus, the monitoring server 120 can determine that the fireplace 140e is likely leaking. In response to determining that the fireplace is likely leaking, the monitoring server 120 can perform an action such as sending a notification to a resident, or shutting a gas shut-off valve to the property or to the fireplace.

In some implementations, a property with a backup natural gas air conditioning and a primary electrical air conditioning unit installed could use gas consumption analysis to avoid costly time-of-use charges for a given utility. For example, the monitoring system can determine to stop using the electrical air conditioner and start using the natural gas air conditioner (or vice versa) based on the time of day and the measured gas consumption. The measured consumption of gas could be used to avoid higher charges associated with a graduated tier of use. For example, if the monitoring server 120 determines that gas consumption by the property is reaching a tier limit, the monitoring server 120 can determine to switch from operating the natural gas air conditioner to operating the electrical air conditioner.

In some implementations, gas consumption monitoring can be used to determine when a gas consuming appliance needs to be repaired or replaced. For example, gas meter data for a water heater 140c could be used to determine that the water heater 140c is underperforming for the amount of gas used compared to other similar water heaters. In another example, gas meter data for a water heater 140c could be used to determine that the water heater 140c is underperforming or based on the amount of water being used at the property. For example, a monitoring system may detect that a water heater is consuming gas to heat water for three hours a day with no hot water consumption at the property. The monitoring system can therefore provide a notification to a resident including a recommendation, e.g., to insulate, replace, or service the water heater 140c. After insulating, replacing, or servicing the water heater 140c, the gas usage data can be used to measure and report gained efficiency of the water heater 140c.

In some implementations, a monitoring system for a business could monitor gas consumption of various appliances. For example, the monitoring system for a commercial laundromat could use video analytics and gas consumption analysis to determine that when particular clothes dryers are run, more gas is consumed when compared to other clothes dryers running. This could indicate that the particular clothes dryers need to be repaired or replaced.

In some implementations, a monitoring system of a property with multiple HVAC systems and zones can determine, based on analyzing gas consumption, that certain zones of the property are not insulated as well as other zones, or that HVAC systems in a given zone of the property are underperforming for the amount of fuel they are consuming. For example, two zones of similar sizes may both have a thermostat setting of 70 degrees. A first HVAC system for a first HVAC zone may consume a first amount of gas. A second HVAC system for a second HVAC zone may consume a second amount of gas that is greater than the first amount of gas. The monitoring system can determine that the second HVAC system is less efficient than the first HVAC system, and can provide a notification to the owner to recommend inspecting the second HVAC system.

In some implementations, gas consumption monitoring can be used to compare gas consumption at the property 102 with gas consumption at other properties. For example, the monitoring server 120 may access a database of gas consumption of other properties. The monitoring server can compare gas consumption of the property to properties that have the same or similar gas consuming appliances. For example, the gas consuming appliances may be the same brand, model, size, etc. The monitoring server 120 can determine that the water heater 140c at the property 102 is consuming more gas that similar water heaters in other properties. The monitoring server 120 can provide a notification to the resident 124 that the water heater may be inefficient, and should be inspected.

In some implementations, a gas distribution can include a primary gas meter unit and one or more secondary gas meter units. For example, a primary gas meter unit may be installed on a gas supply line to the property. A secondary gas meter unit may be installed on each branch of gas piping that connects to a gas consuming appliance. The primary gas meter unit can measure the amount of gas flowing to the property. The primary gas meter unit can also receive data from the secondary gas meter unit indicating the amount of gas flowing to the appliance. The primary gas meter unit can verify that the total amount of gas consumed by each appliance adds up to the amount of gas flowing to the property. If the primary gas meter unit identifies a discrepancy, the primary gas meter unit can determine that a gas leak likely exists in the gas distribution system between the primary gas meter units and the secondary gas meter units.

In some implementations, the monitoring system can prohibit gas consuming appliances from operating unless certain conditions are met. For example, the monitoring system may control a gas shut-off valve for the range 140a. The monitoring system can maintain the shut-off valve in the shut position unless a condition is satisfied, e.g., unless a particular user disarms the security system. For example, a family may include a parent and a child who each have an assigned security code. The monitoring system can maintain the shut-off valve in the shut position unless the parent's security code is entered into the monitoring system, e.g., through a control panel or through an interface presented on a display of the mobile device 126.

In some implementations, the monitoring system can prohibit gas consuming appliances from operating based on geofencing of electronic devices. For example, the monitoring system may control a gas shut-off valve for the fireplace 140*e*. The monitoring system can maintain the shut-off valve in the shut position unless the mobile device 126 is located within a certain geographical range of the property, e.g., within a quarter mile of the property. In some examples, the monitoring system can open the shut-off valve for the fireplace 140*e* in response to the mobile device 126 entering within the geographical range of the property. In some examples, the monitoring system can open the shut-off valve for the fireplace 140*e* in response to a user switching the fireplace 140*e* to "on," after verifying that the mobile device 126 is within the geographical range of the property.

In some implementations, the monitoring system can operate one or more gas shut-off valves in response to detecting an emergency event. For example, the monitoring system may detect indications of an earthquake, e.g., based on data from vibration sensors at or near the property, based on camera data indicating vibrational motion, or based on receiving a notification from a public alert service. The monitoring system can shut the shut-off valve 132 in response to detecting the earthquake. Shutting the shut-off valve 132 for the gas supply to the property can reduce the likelihood and size of gas leaks caused by earthquake damage.

In another example, the monitoring system may detect indications of a fire at or near the property, e.g., based on a fire alarm activating, based on camera data indicating flames or smoke, or based on temperature sensor data. The monitoring system can shut the shut-off valve 132 in response to detecting the fire. Shutting the shut-off valve 132 for the gas supply to the property can reduce the likelihood of the fire igniting the gas.

In some implementations, the monitoring system can determine when gas flow to the property has stopped, e.g., has been reduced to zero therm/hr. For example, a gas utility company may shut of the gas supply to the property for maintenance or due to overdue bills. The monitoring system can determine that gas has been shut off, e.g., based on the gas flow rate dropping to zero therm/hr or based on the shut-off valve 132 being shut. The monitoring system can send a notification to the resident to notify the resident that the gas has been shut off.

In some implementations, one or more gas consuming appliances can include a pilot light sensor. The pilot light sensor can be a sensor that detects heat and/or light from the pilot light of a gas consuming appliance, e.g., of the fireplace 140*e*. The pilot light sensor can determine whether or not the pilot light is lit. If the pilot light is not lit, and the gas consuming appliance continues to consume gas, the monitoring system can perform an action, e.g., of shutting a shut-off valve to the appliance. Shutting the shut-off valve to the gas consuming appliance can prevent gas from escaping into the property.

Figure 2:
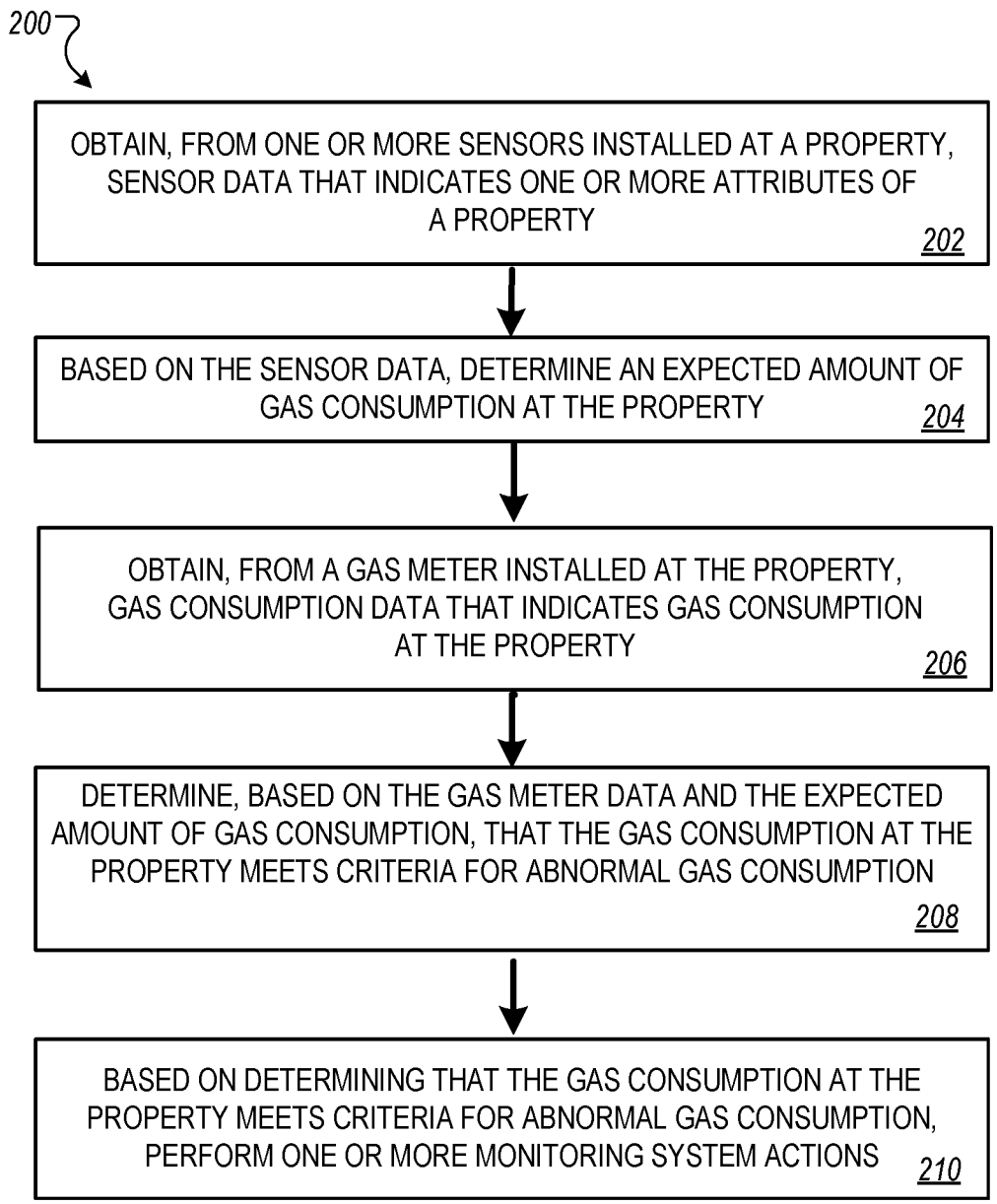
FIG. 2 is a flow diagram illustrating an example of a process for consumable gas leak detection.

FIG. 2 is a flow diagram illustrating an example of a process 200 for using a consumable gas leak detection system. The process 200 can be performed by a server, for example, the monitoring server 120 of system 100. In some implementations, the process 200 can be performed by a control unit of a monitoring system or by the gas meter unit 150. The process 200 can also be performed by a combination of a control unit and a server, a server and a meter, a control unit and a meter, or another computer system. Briefly, process 200 includes obtaining sensor data (202), determining an expected amount of gas consumption at the property (204), obtaining gas meter data (206), determining that the gas consumption at the property meets criteria for abnormal gas consumption (208), and performing one or more system actions (210).

In more detail, in step 202 the system obtains, from one or more sensors installed at a property, sensor data that indicates one or more attributes of a property. In some implementations, the sensor data indicates an operating status of one or more gas consuming appliances at the property. For example, the monitoring server 120 can receive sensor data 104 from the sensors 110 at the property 102. The sensor data 104 may include motion sensor data indicating no motion near a fireplace 140*e* at the property 102, and camera data from a camera 116 indicating no flames in the fireplace 140*e*. The sensor data 104 can also include motion sensor data indicating motion in the kitchen, and camera data indicating lights illuminated on a panel of the range 140*a*.

In step 204, the system determines, based on the sensor data, an expected amount of gas consumption at the property. Determining an expected amount of gas consumption at the property can include determining an operating status of each of a plurality of gas consuming appliances at the property. For example, the monitoring server 120 can determine an operating status of each of the range 140*a*, furnace 140*b*, water heater 140*c*, dryer 140*d*, and fireplace 140*e*.

In some implementations, the operating status of each of the plurality of gas consuming appliances includes an on or off status of each of the plurality of gas consuming appliances. For example, the monitoring server 120 can determine, based on the sensor data 104, that the operating status of the fireplace 140*e* is off, that the operating status of the furnace 140*b* is on, and that the operating status of the range 140*a* is on.

In some implementations, the operating status of each of the plurality of gas consuming appliances includes a power level setting of each of the plurality of gas consuming appliances. For example, the monitoring server 120 can determine, based on the sensor data 104, that the range 140*a* is operating at a high power level and that the furnace 140*b* is operating at a low power level.

In some implementations, determining the operating status of each of the plurality of gas consuming appliances at the property includes storing data identifying one or more of the plurality of gas consuming appliances at the property that are not capable of operation without human interaction. For example, the monitoring server 120 can determine that the range 140*a* and the dryer 140*d* are non-operable without human interaction, and can store data identifying that the range 140*a* and the dryer 140*d* are not capable of operation without human interaction.

In some implementations, determining the operating status of each of the plurality of gas consuming appliances can include determining, based on the sensor data, that the property is unoccupied. For example, the monitoring server 120 can determine, based on the sensor data 104, that the property 102 is unoccupied.

In some implementations, determining, based on the sensor data, that the property is unoccupied includes determining, based on at least one of motion sensor data, camera image data, or microphone data, that the property is unoccupied. For example, the monitoring server 120 can determine that the property 102 is unoccupied based on at least one of motion sensor data indicating a lack of motion at the property 102, camera image data indicating no images of personnel at the property 102, or microphone data indicating no human sounds being detected at the property 102.

Determining the operating status of each of the plurality of gas consuming appliances can include, based on the data identifying the one or more gas consuming appliances at the property that are not capable of operation without human interaction, and based on determining that the property is unoccupied, determining that the identified one or more gas consuming appliances at the property is not in operation. For example, the monitoring server 120 can determine, based on the data identifying that the dryer 140d is not operable without human interaction, and based on determining that the property 102 is unoccupied, that the dryer 140d is not in operation.

In some implementations, determining the operating status of each of the plurality of gas consuming appliances at the property includes: storing data indicating one or more gas consuming appliances at the property that is not capable of operation without human interaction, and storing data identifying an area of the property in which each of the plurality of gas consuming appliances is located. For example, the monitoring server 120 can store data indicating that the dryer 140d is not capable of operation without human interaction, and that the dryer 140d is located on an upper level of the property 102.

Determining the status of each of the plurality of gas consuming appliances can include determining, based on the sensor data, that one or more areas of the property are unoccupied; and based on determining that the one or more areas of the property are unoccupied, determining that the identified one or more gas consuming appliances in the one or more unoccupied areas of the property are not in operation. For example, the monitoring server 120 can determine, based on the sensor data 104, that the upper level of the property 102 is unoccupied. Based on determining that the upper level of the property 102 is unoccupied, and based on the dryer 140d being located on the upper level of the property 102, the monitoring server 120 can determine that the dryer 140d is not in operation.

In some implementations, determining the expected amount of gas consumption at the property includes, based on the operating status of each of the plurality of gas consuming appliances, estimating a gas consumption of each of the plurality of gas consuming appliances. For example, based on determining that the range 140a is operating at a high power level and that the furnace 140b is operating at a low power level, the monitoring server 120 can estimate a gas consumption of the range 140a of 0.3 therm/hr and a gas consumption of the furnace 140b of 0.5 therm/hr.

In some implementations, the expected amount of gas consumption at the property includes a sum of the estimated gas consumption of each of the plurality of gas consuming appliances. For example, the expected amount of gas consumption at the property 102 can include a sum of the estimated gas consumption of the range 140a of 0.3 therm/hr and the gas consumption of the furnace 140b of 0.5 therm/hr, for a sum total of 0.8 therm/hr.

In another example, based on detecting no motion near the fireplace 140e, and no flames visible in the fireplace 140e, the system can determine that the fireplace 140e is likely off and is consuming zero therm/hr. Based on the motion detected in the kitchen, and the lights illuminated on the panel of the range 140a, the system can determine that the range 140a is likely powered on and is consuming 0.3 therm/hr. The system may also determine that the furnace 140b is powered on and is consuming 0.4 therm/hr, and that the water heater 140c is powered on and is consuming 0.2 therm/hr. Thus, the system can determine an expected amount of gas consumption is a sum total of 0.9 therm/hr.

In some implementations, the process includes determining the expected amount of gas consumption based on historical gas consumption at the property. For example, the historical gas consumption can include average gas consumption of each of the gas consuming appliances over a period of time, e.g., of weeks, months, or years. In some examples, the historical gas consumption can include a time-varying total gas consumption at the property 102. For example, the historical gas consumption can vary over time based on time of day, day of week, and/or season of year. In an example, the monitoring server 120 can determine the expected amount of gas consumption on a Saturday morning in summertime based on historical gas consumption indicating average gas consumption at the property 102 on Saturday mornings during summertime.

In some implementations, the sensor data includes a temperature at the property. Determining the expected amount of gas consumption at the property can include determining a thermostat setting at the property, and based on the temperature at the property and the thermostat setting, determining an operating status of an HVAC system at the property. Determining the expected amount of gas consumption at the property can include determining the expected amount of gas consumption at the property based at least in part on the operating status of the HVAC system. For example, the sensor data 104 can include a temperature at the property of sixty-eight degrees. The thermostat setting may be a heat setting of seventy degrees. The monitoring server 120 can determine, based on the temperature of sixty-eight degrees and the thermostat setting of seventy degrees, that the operating status of the HVAC system is on and heating. The monitoring server 120 can thus determine the expected amount of gas consumption at the property based at least in part on the operating status of the HVAC system being on and heating.

In step 206, the system obtains, from a gas meter installed at the property, gas meter data that indicates gas consumption at the property. For example, the system may receive, from the gas meter unit 150, current gas usage data representing gas usage of 1.2 therm/hr at the property. In some examples, the gas usage of 1.2 therm/hr may be a real-time measurement of gas usage at the property. In some examples, the gas usage of 1.2 therm/hr may be an averaged measurement of gas usage over a period of time, e.g., several minutes. The gas usage of 1.2 therm/hr may be due to a combination of operating appliances such as the range 140a, the furnace 140b, the water heater 140c, etc. Additionally, there may be a leaky fixture such as a leaky fireplace 140e.

In step 208, the system determines, based on the gas meter data and the expected amount of gas consumption, that the gas consumption at the property meets criteria for abnormal gas consumption.

In some implementations, determining that the gas consumption at the property meets criteria for abnormal gas consumption includes determining that the gas consumption at the property exceeds the expected amount of gas consumption by at least a specified threshold amount. For example, the monitoring server 120 can determine that the expected gas consumption at the property 102 is 0.8 therm/hr and that the gas consumption at the property is 1.1 therm/hr. Gas usage criteria for abnormal gas consumption can include a threshold amount of 0.2 therm/hr. The monitoring server 120 can determine that the expected gas consumption at the property 102 of 1.1 therm/hr exceeds the expected amount of gas consumption of 0.8 therm/hr by at least the specified threshold of 0.2 therm/hr, and therefore that the gas consumption at the property 102 meets criteria for abnormal gas consumption.

In another example, abnormal gas consumption criteria can include the gas meter data exceeding the expected amount of gas consumption by at least a specified threshold of 0.1 therm/hr. The abnormal gas usage detector 112 can compare the gas usage of 1.2 therm/hr to the expected gas consumption of 0.9 therm/hr. The abnormal gas usage detector 112 can determine that the gas usage of 1.2 therm/hr exceeds the expected gas consumption of 0.9 therm/hr by 0.3 therm/hr, which is greater than the threshold of 0.1 therm/hr. Thus, the abnormal gas usage detector 112 can determine that the gas usage at the property satisfies the gas usage criteria. In response to determining that the gas usage satisfies the gas usage criteria, the monitoring server 120 can determine that a gas leak likely exists at the property 102.

In some implementations, determining that the gas consumption at the property meets criteria for abnormal gas consumption includes determining that the gas consumption at the property is within a range of gas consumption that corresponds to a likely gas leak. For example, a range of gas consumption that corresponds to a likely gas leak may be between 1.3 therm/hr and 2.0 therm/hr. The monitoring server 120 can determine that the gas consumption at the property is 1.5 therm/hr and therefore that the gas consumption is within the range of 1.3 therm/hr to 2.0 therm/hr. Thus, the monitoring server 120 can determine that the gas consumption at the property 102 meets criteria for abnormal gas consumption.

In some implementations, determining that the gas consumption at the property meets criteria for abnormal gas consumption includes determining that a rate of change of gas consumption exceeds a specified threshold rate of gas consumption. For example, a threshold rate of change of gas consumption may be 0.2 therm/hr$^2$. The monitoring server 120 can determine that a rate of change of gas consumption at the property is 0.3 therm/hr$^2$. The monitoring server 120 can determine that the gas consumption at the property 102 meets criteria for abnormal gas consumption based on the rate of change of gas consumption of 0.3 therm/hr$^2$ exceeding the threshold rate of change of gas consumption of 0.2 therm/hr$^2$.

In step 210, based on determining that the gas consumption at the property meets criteria for abnormal gas consumption, the system performs one or more monitoring system actions. In some implementations, the one or monitoring system actions includes operating a shut-off valve to stop a flow of gas through a pipe supplying gas to the property. For example, based on determining that the gas consumption at the property 102 meets criteria for abnormal gas consumption, the monitoring server 120 can operate the shut-off valve 132 by shutting the shut-off valve 132 to cut-off the gas supply to gas consuming appliances 140a-e installed at the property 102.

In some implementations, the property includes a plurality of gas consuming appliances and the gas meter data indicates an amount of gas consumption by a subset of the plurality of gas consuming appliances at the property. Performing the one or more monitoring system actions can include operating one or more shut-off valves to stop a flow of gas through a pipe supplying gas to the subset of the plurality of gas consuming appliances. For example, the gas meter data may indicate that an amount of gas consumption by a subset of gas consuming appliances that includes the range 140a and the furnace 140b satisfies criteria for abnormal gas consumption. The monitoring server 120 can thus operate a shut-off valve to stop a flow of gas through a pipe supplying gas to the subset of gas consuming appliances that includes the range 140a and the furnace 140b.

For example, the system may provide a notification to a user device, e.g., to a mobile device of an owner and/or resident of the property 102. In some examples, the system may perform an action to reduce or stop of the flow of gas to the property 102. For example, the system may perform an action of remotely operating a shut-off valve. The system can shut the shut-off valve in order to stop the flow of gas to the property 102, to a particular area of the property 102, or to a particular gas consuming appliance of the property 102.

Figure 3:
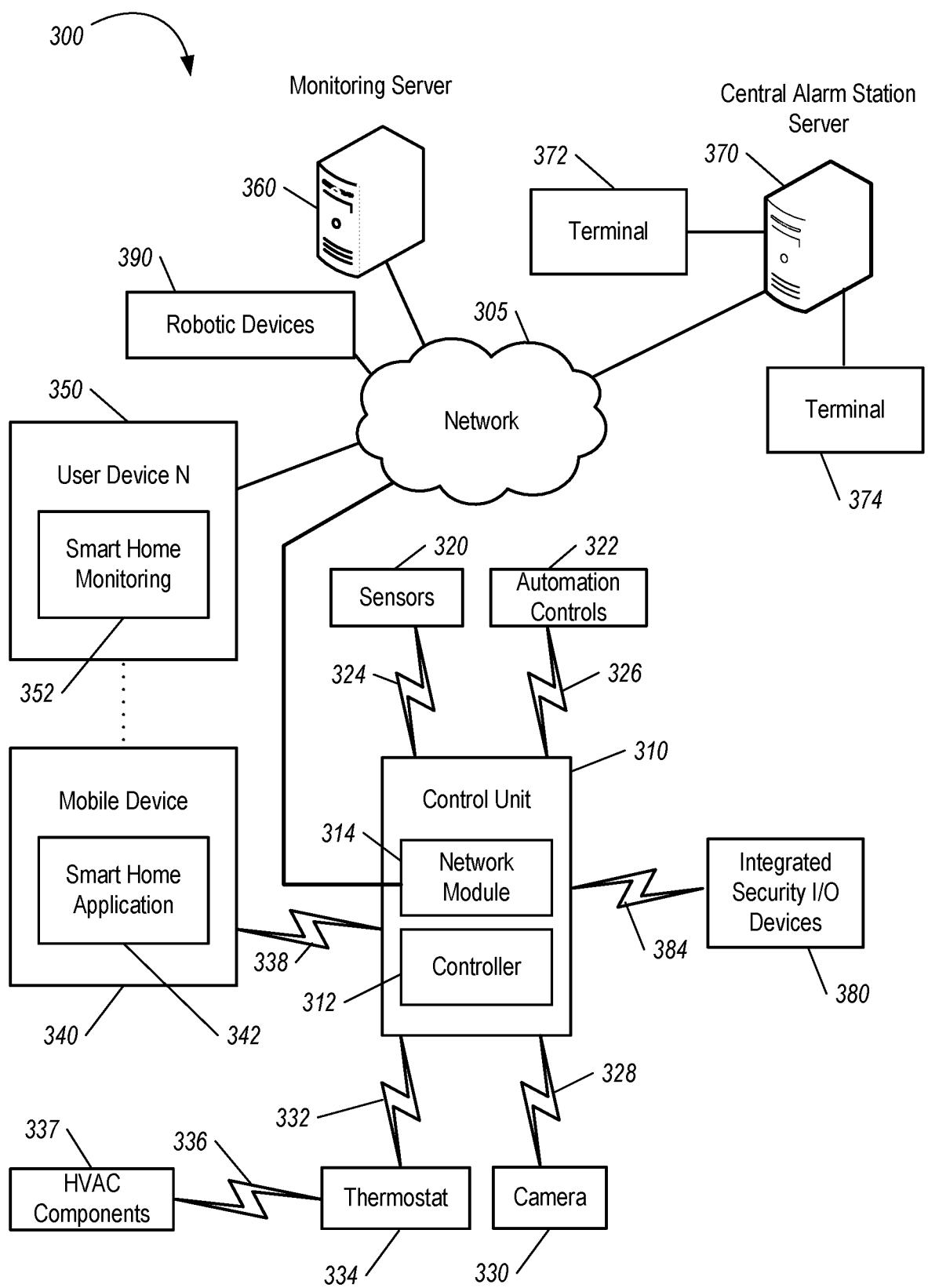
FIG. 3 is a diagram illustrating an example of a property monitoring system.

FIG. 3 is a diagram illustrating an example of a home monitoring system 300. The monitoring system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-dO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. In addition, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 390 may be devices that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid-state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

In addition, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 324, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events generated by the control unit 310. In this example, the monitoring server 360 may exchange electronic communications with the network module 314 included in the control unit 310 to receive information regarding events detected by the control unit 310. The monitoring server 360 also may receive information regarding events from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system and perform analysis of sensor and image data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the controls 322, possibly through the control unit 310.

The monitoring server 360 can be configured to provide information (e.g., activity patterns) related to one or more residents of the home monitored by the system 300 (e.g., resident 124). For example, one or more of the sensors 320, the home automation controls 322, the camera 330, the thermostat 334, and the integrated security devices 380 can collect data related to a resident including location information (e.g., if the resident is home or is not home) and provide location information to the thermostat 334.

The central alarm station server 370 is an electronic device configured to provide alarm monitoring service by exchanging communications with the control unit 310, the one or more user devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more user devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the home monitoring application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a home monitoring application 352. The home monitoring application 342 refers to a software/firmware program running on the corresponding mobile device that enables the user interface and features described throughout. The user device 340 may load or install the home monitoring application 342 based on data received over a network or data received from local media. The home monitoring application 342 runs on mobile devices platforms, such as iPhone, iPod touch, Blackberry, Google Android, Windows Mobile, etc. The home monitoring application 342 enables the user device 340 to receive and process image and sensor data from the monitoring system.

The user device 340 may be a general-purpose computer (e.g., a desktop personal computer, a workstation, or a laptop computer) that is configured to communicate with the monitoring server 360 and/or the control unit 310 over the network 305. The user device 340 may be configured to display a smart home user interface 352 that is generated by the user device 340 or generated by the monitoring server 360. For example, the user device 340 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, and the robotic devices 390. The one or more user devices 340 and 350 receive data directly from the sensors 320, the home automation controls 322, the camera 330, and the robotic devices 390, and sends data directly to the sensors 320, the home automation controls 322, the camera 330, and the robotic devices 390. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, and the robotic devices 390, and are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, and the robotic devices 390 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, and the robotic devices 390 to a pathway over network 305 when the one or more user devices 340 and 350 are farther from the sensors 320, the home automation controls 322, the camera 330, the thermostat 334, and the robotic devices 390.

In some examples, the system leverages GPS information from the one or more user devices 340 and 350 to determine whether the one or more user devices 340 and 350 are close enough to the sensors 320, the home automation controls 322, the camera 330, the thermostat 334, and the robotic devices 390 to use the direct local pathway or whether the one or more user devices 340 and 350 are far enough from the sensors 320, the home automation controls 322, the camera 330, the thermostat 334, and the robotic devices 390 that the pathway over network 305 is required.

In other examples, the system leverages status communications (e.g., pinging) between the one or more user devices 340 and 350 and the sensors 320, the home automation controls 322, the camera 330, the thermostat 334, and the robotic devices 390 to determine whether communication using the direct local pathway is possible. If communication using the direct local pathway is possible, the one or more user devices 340 and 350 communicate with the sensors 320, the home automation controls 322, the camera 330, the thermostat 334, and the robotic devices 390 using the direct local pathway. If communication using the direct local pathway is not possible, the one or more user devices 340 and 350 communicate with the sensors 320, the home automation controls 322, the camera 330, the thermostat 334, and the robotic devices 390 using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
    obtaining, from one or more sensors installed at a property, sensor data that indicates one or more attributes of the property;
    determining a total estimated gas consumption of a plurality of gas consuming appliances at the property, including, for each gas consuming appliance:
       determining, using the sensor data, a likely operating status of the gas consuming appliance; and
       determining, using the likely operating status of the gas consuming appliance, an estimated gas consumption of the gas consuming appliance;
    obtaining, from a gas meter installed at the property, gas meter data that indicates measured gas consumption at the property;
    comparing the total estimated gas consumption of the plurality of gas consuming appliances to the measured gas consumption at the property; and
    in response to determining that a difference between the total estimated gas consumption of the plurality of gas consuming appliances and the measured gas consumption at the property satisfies a threshold difference, performing one or more monitoring system actions.

2. The method of claim 1, wherein the likely operating status of appliances the gas consuming appliance comprises a likely on or off status of the gas consuming appliance.

3. The method of claim 1, wherein the likely operating status of the gas consuming appliance comprises a likely power level setting of the gas consuming appliance.

4. The method of claim 1, wherein determining the likely operating status of the gas consuming appliance comprises:
    storing data identifying one or more of the plurality of gas consuming appliances at the property that are not capable of operation without human interaction;
    determining, using the stored data, that the gas consuming appliance is included in the one or more of the plurality of gas consuming appliances that are not capable of operation without human interaction;
    determining, using the sensor data, that the property is unoccupied; and
    in response to determining that the property is unoccupied and that the gas consuming appliance is included in the one or more of the plurality of gas consuming appliances at the property that are not capable of operation without human interaction, determining that the gas consuming appliance is not in operation.

5. The method of claim 4, wherein determining, using the sensor data, that the property is unoccupied comprises determining, using at least one of motion sensor data, camera image data, or microphone data, that the property is unoccupied.

6. The method of claim 1, wherein determining the likely operating status of the gas consuming appliance comprises:
    storing first data identifying one or more of the plurality of gas consuming appliances at the property that are not capable of operation without human interaction;
    storing second data identifying a respective area of the property in which each of the plurality of gas consuming appliances is located;
    identifying, using the sensor data, one or more areas of the property that are unoccupied;
    determining, using the first data, that the gas consuming appliance is included in the one or more of the plurality of gas consuming appliances that are not capable of operation without human interaction
    determining, using the second data, that the respective area of the property in which the gas consuming appliance is located is included in the one or more areas of the property that are unoccupied; and
    in response to determining that the gas consuming appliance is included in the one or more of the plurality of gas consuming appliances that are not capable of operation without human interaction and that the respective area of the property in which the gas consuming appliance is located is included in the one or more areas of the property that are unoccupied, determining that the gas consuming appliance is not in operation.

7. The method of claim 1, comprising determining the estimated gas consumption of the gas consuming appliance using historical data indicating gas consumption of the gas consuming appliance in multiple different operating statuses.

8. The method of claim 1, wherein the one or monitoring system actions includes operating a shut-off valve to stop a flow of gas through a pipe supplying gas to the property.

9. The method of claim 1, wherein:
    the gas meter data indicates measured gas consumption of a subset of the plurality of gas consuming appliances at the property, and
    performing the one or more monitoring system actions comprises operating one or more shut-off valves to stop a flow of gas through a pipe supplying gas to the subset of the plurality of gas consuming appliances.

10. The method of claim 1, wherein:
    the sensor data indicates a temperature at the property, the plurality of gas consuming appliances includes an HVAC system, and determining the likely operating status of the HVAC system comprises:
- determining a thermostat setting at the property; and
- determining, using the temperature at the property and the thermostat setting, a likely operating status of the HVAC system.

11. The method of claim 1, wherein determining that the difference between the total estimated gas consumption of the plurality of gas consuming appliances and the measured gas consumption at the property satisfies a threshold difference comprises determining that the measured gas consumption at the property exceeds the total estimated gas consumption of the plurality of gas consuming appliances by at least a specified threshold amount.

12. The method of claim 1, comprising, in response to determining that the difference between the total estimated gas consumption of the plurality of gas consuming appliances and the measured gas consumption at the property satisfies a threshold difference, determining that a gas leak is likely occurring at the property.

13. The method of claim 1, comprising:
- identifying, using the sensor data and the measured gas consumption at the property, a particular gas consuming appliance for which the likely operating status does not match an actual operating status; and
- determining that the particular gas consuming appliance is in an abnormal operating status.

14. The method of claim 13, wherein performing the one or more monitoring system actions comprises transmitting, to a user device, a notification indicating that the particular gas consuming appliance is in the abnormal operating status.

15. The method of claim 13, wherein identifying the particular gas consuming appliance for which the likely operating status does not match the actual operating status comprises:
- determining that the difference between the total estimated gas consumption of the plurality of gas consuming appliances and the measured gas consumption at the property is within a range of likely gas consumption for the particular gas consuming appliance.

16. The method of claim 13, wherein:
- the sensor data includes camera image data depicting the particular gas consuming appliance, and
- identifying the particular gas consuming appliance for which the likely operating status does not match the actual operating status comprises determining, using the camera image data, the actual operating status of the particular gas consuming appliance.

17. A system comprising:
- one or more sensors installed at a property;
- a gas meter installed at the property; and
- one or more computers configured to perform operations comprising:
  - obtaining, from the one or more sensors, sensor data that indicates one or more attributes of the property;
  - determining a total estimated gas consumption of a plurality of gas consuming appliances at the property, including, for each gas consuming appliance:
    - determining, using the sensor data, a likely operating status of the gas consuming appliance; and
    - determining, using the likely operating status of the gas consuming appliance, an estimated gas consumption of the gas consuming appliance;
  - obtaining, from the gas meter, gas meter data that indicates measured gas consumption at the property;
  - comparing the total estimated gas consumption of the plurality of gas consuming appliances to the measured gas consumption at the property; and
  - in response to determining that a difference between the total estimated gas consumption of the plurality of gas consuming appliances and the measured gas consumption at the property satisfies a threshold, performing one or more monitoring system actions.

18. The system of claim 17, wherein the likely operating status of the gas consuming appliance comprises a likely on or off status of the gas consuming appliance.

19. The system of claim 17, wherein the likely operating status of the gas consuming appliance comprises a likely power level setting of the gas consuming appliance.

20. A non-transitory computer-readable medium storing software comprising instructions executable by one or more computers which, upon such execution, cause the one or more computers to perform operations comprising:
- obtaining, from one or more sensors installed at a property, sensor data that indicates one or more attributes of the property;
- determining a total estimated gas consumption of a plurality of gas consuming appliances at the property, including, for each gas consuming appliance:
  - determining, using the sensor data, a likely operating status of the gas consuming appliance; and
  - determining, using the likely operating status of the gas consuming appliance, an estimated gas consumption of the gas consuming appliance;
- obtaining, from a gas meter installed at the property, gas meter data that indicates measured gas consumption at the property;
- comparing the total estimated gas consumption of the plurality of gas consuming appliances to the measured gas consumption at the property; and
- in response to determining that a difference between the total estimated gas consumption of the plurality of gas consuming appliances and the measured gas consumption at the property satisfies a threshold difference , performing one or more monitoring system actions.

* * * * *

UNITED STATES PATENT AND TRADEMARK OFFICE
CERTIFICATE OF CORRECTION

PATENT NO. : 11,656,145 B2
APPLICATION NO. : 17/507925
DATED : May 23, 2023
INVENTOR(S) : Colby Kevin Clark It is certified that error appears in the above-identified patent and that said Letters Patent is hereby corrected as shown below:

In the Claims

In Claim 1, Column 33, Line 45, delete "appliance;" and insert -- appliance: --.

In Claim 2, Column 33, Line 63, delete "of appliances" and insert -- of --.

In Claim 4, Column 34, Line 15, before "that" delete "at the property".

In Claim 17, Column 36, Line 20, delete "threshold," and insert -- threshold difference, --.

In Claim 20, Column 36, Line 53 (approx.), delete "difference ," and insert -- difference, --.

Signed and Sealed this
Eleventh Day of July, 2023

Katherine Kelly Vidal
*Director of the United States Patent and Trademark Office*